(12) United States Patent
Winchester

(10) Patent No.: US 6,632,752 B2
(45) Date of Patent: Oct. 14, 2003

(54) PROTECTIVE CLOTHING

(75) Inventor: James Winchester, McLean, VA (US)

(73) Assignee: Renal Tech International LLC, New York, NY (US)

( * ) Notice: Subject to any disclaimer, the term of this patent is extended or adjusted under 35 U.S.C. 154(b) by 203 days.

(21) Appl. No.: 09/782,008

(22) Filed: Feb. 14, 2001

(65) Prior Publication Data

US 2002/0110687 A1 Aug. 15, 2002

(51) Int. Cl.[7] .............................. B32B 5/18; B32B 5/22; B32B 27/12; B32B 3/26
(52) U.S. Cl. ........................... 442/121; 442/76; 442/77; 442/118; 442/122; 428/304.4; 428/316.6
(58) Field of Search .......................... 428/304.4, 316.6; 442/30, 56, 76, 77, 121, 122, 118, 123

(56) References Cited

U.S. PATENT DOCUMENTS

| | | | | |
|---|---|---|---|---|
| 4,455,187 A | * | 6/1984 | von Blucher et al. | 156/277 |
| 4,677,019 A | * | 6/1987 | von Blucher | 442/227 |
| 5,190,806 A | * | 3/1993 | Nomi | 428/198 |
| 5,277,963 A | * | 1/1994 | von Blucher et al. | 428/206 |
| 6,054,109 A | * | 4/2000 | Saito et al. | 423/584 |
| 6,087,300 A | * | 7/2000 | Davankov et al. | 502/402 |
| 6,114,466 A | * | 9/2000 | Davankov et al. | 525/332.2 |
| 6,133,393 A | * | 10/2000 | Davankov et al. | 526/318.4 |
| 6,136,424 A | * | 10/2000 | Davankov et al. | 428/305.5 |
| 6,153,707 A | * | 11/2000 | Davankov et al. | 525/333.2 |

FOREIGN PATENT DOCUMENTS

EP          WO 99/39823          *    8/1999

* cited by examiner

Primary Examiner—Cheryl A. Juska
Assistant Examiner—Jenna-Leigh Befumo
(74) Attorney, Agent, or Firm—I. Zborovsky

(57) ABSTRACT

An article of clothing has a clothing part adapted to surround and cover a user's body, and a layer of a polymeric adsorbing material applied on the clothing part and formed so as to retain at least some toxic components of a poison gas so as to prevent penetration of the some toxic components to a user's body.

5 Claims, 2 Drawing Sheets

PROTECTIVE CLOTHING

BACKGROUND OF THE INVENTION

The present invention relates to protective clothing, in particular for protection of a user from damaging action of a poison gas.

It is known that in order to avoid significant damages from exposure to poison gas released by an enemy in the time of war, or a poison gas in advertently leaking from corresponding sources in the time of peace, it is necessary to wear a protective clothing.

Protective clothing has been known in many various modifications. It is believed that it is advisable to further improve the protective clothing, in particular for protection of an individual from damaging action of poison gas.

SUMMARY OF THE INVENTION

Accordingly, it is an object of present invention to provide a protective coating which is a further improvement of the existing clothing of this type.

In keeping with these objects and with others which will become apparent hereinafter, one feature of present invention resides, briefly stated, in a protective clothing which has a clothing part adapted to surround a user's body; and a protective coating applied on said clothing part and composed of polymeric adsorbing material formed so that it adsorbs at least some poisonous components of a poison gas and therefore prevents their action on the user's body.

In accordance with various embodiments of the present invention, the adsorbing material can be applied on an outer surface of the closing part, can be covered additionally by an exterior layer, can be applied on the closing part in several successive layers. The adsorbing polymeric material which is suitable for this purpose can be formed as porous hydrophobic divinylbenzene copolymer which initially has surface exposed vinyl groups in which thereafter the vinyl groups are chemically modified so as to form different surface exposed functional groups with a greater hydrophilicity and greater biocompatibility than those of the vinyl groups, as disclosed for example in U.S. Pat. Nos. 6,087,300; 6,114,466; 6,133,393; 6,136,424, and 6,153,707.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
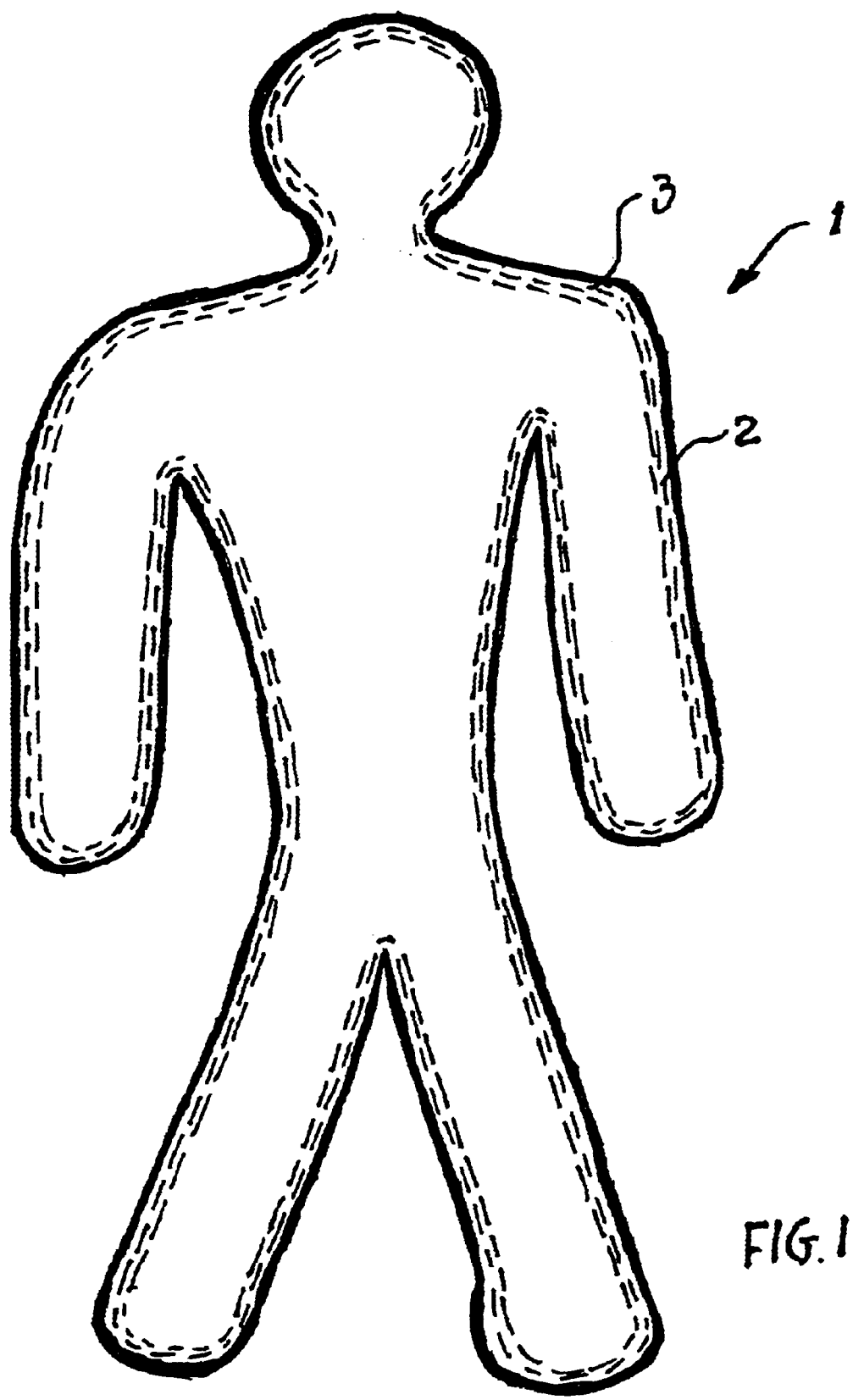
FIG. 1 is a view showing a protective article of clothing.

A protective clothing in accordance with the present invention is shown in FIG. 1 and identified as a whole with reference numeral 1. It has a clothing part which is identified with reference numeral 2 and is designed to surround and cover a body of the user. The clothing part can be composed of conventional materials, such as fabric, plastic, etc.

In accordance with the present invention, a protective coating is applied to the clothing part 2. The protective coating is identified with reference numeral 3.

In accordance with the invention, the protective coating is composed of a polymeric adsorbing material which adsorbs at least some toxic substances of the poison gas. Such material can be for example porous hydrophobic divinylbenzene copolymer which initially has surface exposed vinyl groups in which thereafter the vinyl groups are chemically modified so as to form different surface exposed functional groups with a greater hydrophilicity and greater biocompatiblity than those of the vinyl groups.

Figure 2:
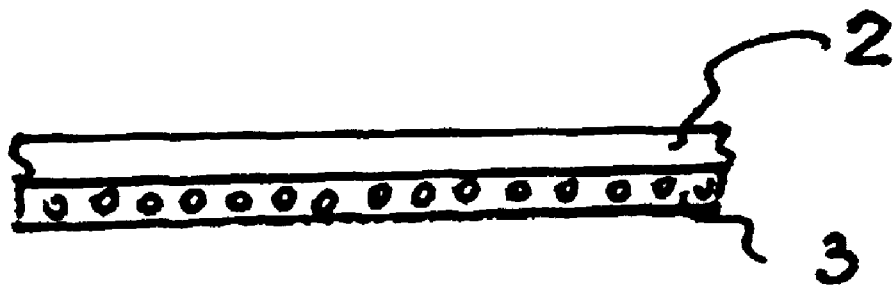
FIG. 2 is a view showing a cross-section of the protective article of clothing in accordance with one embodiment of the present invention.

In the embodiment shown in FIG. 2, the protective coating 3 is composed of a single layer of the above mentioned adsorbing polymeric adsorbing material which is applied on the clothing part 2. The application can be performed by glueing, joint extrusion, copolymerization, etc. The single layer of the adsorbing material 3 adsorbs at least some toxic substances over the poison gas.

Figure 3:
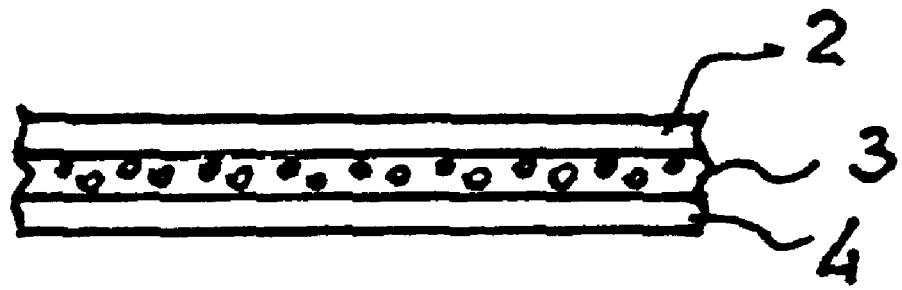
FIG. 3 is a view showing a cross-section of the protective article of clothing in accordance with another embodiment of the present invention.
Figure 4:
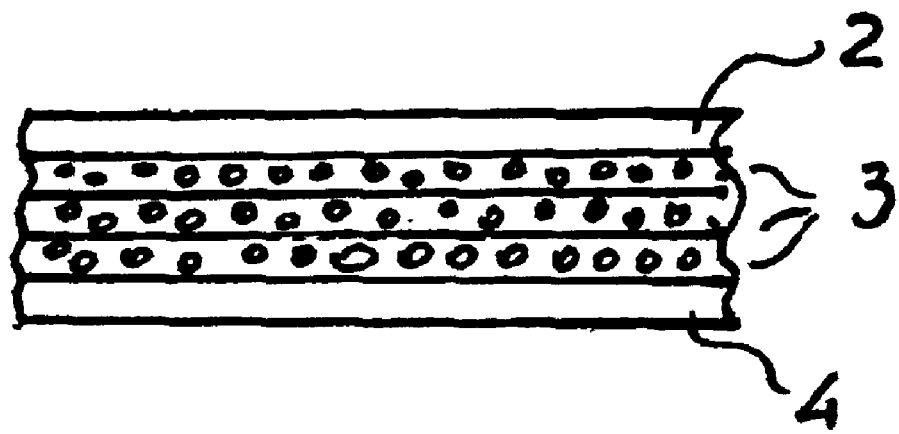
FIG. 4 is a view showing a cross-section of the protective article of clothing in accordance with a further embodiment of the present invention.

In accordance with another embodiment shown in FIG. 3, an additional exterior layer is applied on the layer 3 of adsorbing material. The additional exterior layer 4 together with clothing parts 2 limit a space for accommodation of the adsorbing material 3. Also, it protects the adsorbing material 3 from outside, from mechanical actions. The layer 4 can be composed of any material. Both the clothing part 2 and the exterior layer 4 are composed of a material which either does not have openings or has openings with an opening size smaller than the size of the grains of the adsorbing material 3.

In accordance with a further embodiment of the present invention, several layers 3 of the adsorbing material are provided. The inner most layer of adsorbing material 3 is applied on the clothing part 2, while the exterior layer 4 is applied from outside on the outermost layer 3 of the adsorbing material. One of several intermediate layers are provided between the layers 3 of the adsorbing material. Thus, the layers of the adsorbing material 3 form a multi-stage filtering structure which retains toxic components of a poison gas.

It will be understood that each of the elements described above, or two or more together, may also find a useful application in other types of constructions differing from the types described above.

While the invention has been illustrated and described as embodied in protective clothing, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is:

1. An article of clothing, comprising a clothing part adapted to surround and cover a users s body; and a layer of a polymeric adsorbing material applied on said clothing part and formed so as to retain at least some toxic components of a poison gas so as to prevent penetration of the some toxic components to a user's body, said polymeric adsorbing material including porous hydrophobic divinylbenzene copolymer which initially has surface exposed vinyl groups in which thereafter the vinyl groups are chemically modified so as to form different surface exposed functional groups with a greater hydrophilicity and greater biocompatibility than those of the vinyl groups.

2. An article of clothing as defined in claim 1, wherein said adsorbing material is arranged in a single layer.

3. An article of clothing as defined in claim 1, wherein said adsorbing material is arranged in several layers located on said clothing part.

4. An article of clothing as defined in claim 3; and further comprising separating elements located between said layers of said adsorbing material.

5. An article of clothing as defined in claim 1; and further comprising an exterior layer applied from on an outside of said adsorbing material.

* * * * *